(12) United States Patent
Uhr et al.

(10) Patent No.: US 11,544,640 B2
(45) Date of Patent: Jan. 3, 2023

(54) METHOD FOR PROVIDING ONLINE TICKET SERVICE BY USING BLOCKCHAIN NETWORK AND SERVER USING THE SAME

(71) Applicant: Coinplug, Inc., Seongnam-si (KR)

(72) Inventors: Joon Sun Uhr, Seongnam-si (KR); Jay Wu Hong, Seoul (KR); Joo Han Song, Seongnam-si (KR)

(73) Assignee: Coinplug, Inc., Seongnam-si (KR)

( * ) Notice: Subject to any disclaimer, the term of this patent is extended or adjusted under 35 U.S.C. 154(b) by 0 days.

(21) Appl. No.: 17/631,754

(22) PCT Filed: Jun. 10, 2020

(86) PCT No.: PCT/KR2020/007496
§ 371 (c)(1),
(2) Date: Jan. 31, 2022

(87) PCT Pub. No.: WO2021/020721
PCT Pub. Date: Feb. 4, 2021

(65) Prior Publication Data
US 2022/0277234 A1    Sep. 1, 2022

(30) Foreign Application Priority Data
Jul. 31, 2019  (KR) .................. 10-2019-0093572

(51) Int. Cl.
*G06Q 10/04*       (2012.01)
(52) U.S. Cl.
CPC .................... *G06Q 10/04* (2013.01)
(58) Field of Classification Search
CPC ..................................................... G06Q 10/04
(Continued)

(56) References Cited

U.S. PATENT DOCUMENTS

| | | | |
|---|---|---|---|
| 2014/0100896 A1* | 4/2014 | Du | G06Q 10/02 705/5 |
| 2015/0134371 A1* | 5/2015 | Shivakumar | G06F 16/954 705/5 |
| 2017/0178034 A1* | 6/2017 | Skeen | H04L 65/612 |

FOREIGN PATENT DOCUMENTS

| | | |
|---|---|---|
| JP | 2018097725 A | 6/2018 |
| KR | 101841565 B1 | 3/2018 |

(Continued)

OTHER PUBLICATIONS

"Secure Event Tickets on a blockchain" Published by Lecture Notes in Computer Science (Year: 2017).*
(Continued)

*Primary Examiner* — Zeina Elchanti
(74) *Attorney, Agent, or Firm* — Kaplan Breyer Schwarz, LLP

(57) ABSTRACT

The present invention relates to a method for providing an online ticket service by using a blockchain network, comprising steps of: (a) in response to acquiring ticket reservation information corresponding to a ticket purchased by a purchaser from a ticket sale server, creating a ticket token corresponding to the ticket by referring to the ticket reservation information, and registering generated information on the ticket token in a distributed ledger of a blockchain network; and (b) transmitting the ticket token to a seller token wallet corresponding to the seller of the ticket, thereby (i) causing the seller token wallet to transmit the ticket token to a user token wallet corresponding to the user of the ticket, and (ii) registering movement information of the ticket token from the seller token wallet to the user token wallet in the distributed ledger of the blockchain network.

22 Claims, 4 Drawing Sheets

(58) Field of Classification Search
USPC .......................................................... 705/5
See application file for complete search history.

(56) References Cited

FOREIGN PATENT DOCUMENTS

| KR | 1020180104586 A | 9/2018 |
| KR | 101928087 B1 | 2/2019 |

OTHER PUBLICATIONS

Bloter, Internet News, Blockchain Commercialization Trend is "Decentralized IDentitiers (DID)", Jul. 25, 2019, Retrieved on Sep. 2, 2020 from URL: http://www.bloter.net/archives/347801, See pp. 1-2.
Decision to Grant issued in Korean patent application No. 10-2019-0093572, dated Jun. 9, 2020, 3 pp. w/ translation.
Office Action issued in Korean patent application No. 10-2019-0093572, dated Sep. 26, 2019,13 pp. w/ translation.
Final Office Action issued in Korean patent application No. 10-2019-0093572, dated Apr. 27, 2020, 8 pp. w/ translation.
International Search Report issued in PCT application No. PCT/KR2020/007496, dated Sep. 24, 2020, 2 pp.

\* cited by examiner

METHOD FOR PROVIDING ONLINE TICKET SERVICE BY USING BLOCKCHAIN NETWORK AND SERVER USING THE SAME

CROSS REFERENCE TO RELATED APPLICATION

This application is a U.S. National Stage of PCT/KR2020/007496, filed Jun. 10, 2020, which claims foreign priority to Korean application 10-2019-0093572 filed Jul. 31, 2019, the disclosures of which are incorporated herein by reference.

FIELD OF THE DISCLOSURE

The present disclosure relates to a method for providing an online ticket service by using a blockchain network and a server using the same; and more particularly, to the method for providing an online ticket service by converting a ticket into a ticket token based on the blockchain network and the server using the same.

BACKGROUND OF THE DISCLOSURE

In the case of sale of tickets used in entries to performances, film screening, exhibitions, sports arena and amusement park, etc., the sale is made generally by sale at site or reservation sale through the Internet.

In particular, due to the development in the economy and the industry, people have attention to leisure, and for the tickets used in cultural events, rather than the former manner of visiting a designated advance ticket office to purchase the ticket or reservation through telephone, the manner of ticket purchase through the Internet is more popularly used. In the case of purchasing a ticket through the Internet, there is an advantage of being able to purchase the ticket easily without the inconvenience of directly visiting or telephoning the office.

However, recently there is an increase in activities in the online network, in which a macro program is used in purchasing tickets in a mass, and reselling to other persons at a higher price, but current situation lacks regulations to prevent or prohibit such activities in advance. Accordingly, problems are arising such as the actual consumers being unable to see the performance or sports event, or consumers paying excessively high price for the ticket.

In addition, the online illegal tickets are traded through online clubs or Apps mainly trading secondhand goods, ticket transaction specialist websites, and small scale businesses are selling them through social network services (SNS) such as Twitter.

Although the conduct of selling an illegal ticket at site is liable under the Minor Offences Act, in case of an online illegal ticket transaction, there is no clear solution to sanction.

Ticket sale businesses and performance hosts are exerting efforts in various aspects in order to eradicate online illegal tickets.

As one example, in order to eradicate the illegal tickets, some performance events carry out procedures such as verification of identification, but due to this, there is a problem of causing inconvenience to audiences.

In addition, security characters comprised of alphabets and numbers are inserted between the middle of the payment stage, for a person to directly read and input in order to move on to the next stage, to thereby prevent a mass purchase using a macro program, but this is also causing inconvenience to actual purchasers.

In addition, in such a conventional ticket sale manner, old-fashioned ticket issuing manner such as at site issuing and mail sending are still prevailing, and thus waste of resources are occurring, and various disputes are arising due to loss of or damage to the ticket, etc.

In addition, due to offline issuing services, in the aspect of the use, there exist many inconveniences such as transfer, management, possession and gifting of the right of use of the ticket.

In addition, in the conventional ticket sale method, if the seller business does not verify the ticket, the genuineness of the ticket cannot be confirmed, and thus the purchaser will be restricted in exercising the property right of the ticket, and since the management for the issue of genuineness of the ticket, etc. is not made, there exists an opacity for the ticket management.

In particular, in case of a ticket purchased through an online ticket agency site or transactions between individuals, the issue of genuineness cannot be verified, and thus damages due to ticket forgery fraud and ticket delivery delay, etc. are occurring.

SUMMARY OF THE DISCLOSURE

It is an object of the present disclosure to solve all the aforementioned problems.

It is another object of the present disclosure to prevent illegal ticket purchases using macro programs, etc.

It is still another object of the present disclosure to prevent inconvenience of a user by procedures such as verification of identification.

It is still another object of the present disclosure to easily verify ownership and genuineness of a ticket.

It is still another object of the present disclosure to secure transparency of ticket sales.

It is still another object of the present disclosure to prevent damages due to ticket forgery fraud and ticket delivery delay, etc.

In accordance with one aspect of the present disclosure, there is provided a method for providing an online ticket service by using a blockchain network, comprising steps of: (a) in response to acquiring ticket reservation information corresponding to a ticket purchased by a purchaser from a ticket sale server, a service server creating a ticket token corresponding to the ticket by referring to the ticket reservation information, and registering generated information on the ticket token in a distributed ledger of a blockchain network, wherein the ticket reservation information includes at least one of usage information of the ticket, usage condition information of the ticket, user information of a user of the ticket, and seller information of the ticket; and (b) the service server transmitting the ticket token to a seller token wallet corresponding to the seller of the ticket, thereby (i) causing the seller token wallet to transmit the ticket token to a user token wallet corresponding to the user of the ticket, and (ii) registering movement information of the ticket token from the seller token wallet to the user token wallet in the distributed ledger of the blockchain network.

As one example, the user information may include a user DID (decentralized identity) corresponding to the user of the ticket, and wherein the user DID is user identification information used in the blockchain network, and the user DID and authentication information of the user of the ticket for pieces of personal information of the user of the ticket corresponding to the user DID are registered in the distributed ledger of the blockchain network, and the pieces of personal information of the user of the ticket are stored in a user terminal of the user of the ticket or a DID data hub, and wherein, at the step of (a), the service server may (i) request specific evidential information of the user to the user terminal by using the user DID corresponding to the ticket reservation information, wherein the specific evidential information is used for confirming the usage condition information of the ticket, (ii) in response to acquiring the specific evidential information of the user of the ticket from the user terminal or from the DID data hub through interactions with the user terminal, confirm whether the specific evidential information of the user of the ticket satisfies the usage condition information of the ticket, and (iii) generate the ticket token corresponding to the ticket in case the specific evidential information of the user of the ticket satisfies the usage condition of the ticket.

As one example, the service server may, in response to acquiring the specific evidential information of the user of the ticket from the user terminal or from the DID data hub through interactions with the user terminal, (i) confirm the authentication information registered in the distributed ledger of the blockchain network by using the user DID, (ii) verify the specific evidential information of the user of the ticket as valid if the specific evidential information of the user of the ticket matches with the authentication information of the user of the ticket, and (iii) confirm whether the specific evidential information of the user of the ticket satisfies the usage condition information of the ticket.

As one example, the method may further comprise a step of: (c) when the ticket token is transmitted to a token receiving wallet by interactions with a ticket confirmation terminal in response to usage request information of the ticket token from a specific user terminal, wherein the specific user terminal includes one of the user terminal of the user of the ticket or another user terminal of a third party user who obtained the ticket, the service server, (i) confirming whether the ticket token is valid by referring to the movement information of the ticket token registered, in the distributed ledger of the blockchain network, and (ii) when the ticket token is confirmed as valid, transmitting approval information for the ticket usage to the ticket confirmation terminal or the specific user terminal, and registering the usage information of the ticket token in the distributed ledger of the blockchain network.

As one example, in response to acquiring verification information for the approval information from the ticket confirmation terminal or the specific user terminal, the service server may destroy the ticket token stored in the token receiving wallet, and register destruction information of the ticket token in the distributed ledger of the blockchain network.

As one example, in response to acquiring verification information for the approval information from the ticket confirmation terminal or the specific user terminal, the service server may (i) generate a collection token corresponding to the ticket token, (ii) transmit the collection token to the specific user terminal, and (iii) register generated information on the collection token in the distributed ledger of the blockchain network.

As one example, the usage request information of the ticket token may include a specific user DID (decentralized identity) corresponding to a specific user who is the owner of the specific user terminal, wherein the specific user DID is specific user identification information used in the blockchain network, and the specific user DID and authentication information of the specific user for pieces of personal information of the specific user corresponding to the specific user DID are registered in the distributed ledger of the blockchain network, and the pieces of personal information of the specific user are stored in DID data hub or the specific user terminal of the specific user, and wherein the service server may (i) request specific evidential information, of the specific user, for confirming the usage condition information of the ticket to the specific user terminal by using the specific user DID, and (ii) in response to acquiring the specific evidential information of the specific user from the specific user terminal or from the DID data hub through interactions with the specific user terminal, verify whether the specific evidential information of the specific user satisfies the usage condition information of the ticket of the ticket reservation information, and (iii) when the specific evidential information of the specific user satisfies the usage condition information of the ticket, transmit the approval information for the ticket usage.

As one example, the service server may, in response to acquiring the specific evidential information of the specific user from the specific user terminal or from the DID data hub through interactions with the specific user terminal, (i) confirm the authentication information of the specific user registered in the distributed ledger of the blockchain network by using the specific user DID of the specific user, (ii) verify the specific evidential information of the specific user as valid if the specific evidential information of the specific user matches with the authentication information of the specific user, and (iii) confirm whether the specific evidential information of the specific user satisfies the usage condition information of the ticket.

As one example, the method may further comprise a step of: (d) when a refund request of the ticket token is acquired from the specific user terminal, which includes one of a user terminal of the user of the ticket or another user terminal of a third party user who obtained the ticket, the service server (i) confirming whether the ticket token is valid by referring to the movement information of the ticket token registered in the distributed ledger of the blockchain network, and (ii) when the ticket token is confirmed as valid, (ii-1) transmitting the ticket token from a specific user token wallet of the specific user to a token refund wallet, (ii-2) registering the movement information of the ticket token from the specific user token wallet to the token refund wallet in the distributed ledger of the blockchain network, and (ii-3) transmitting refund request information of the ticket token to the ticket sale server, and thereby instructing the ticket sale server to make a refund for the ticket corresponding to the ticket token.

In addition, according to one example of the present invention, there is provided a method for providing an online ticket service by using a blockchain network, comprising steps of: (a) in response to acquiring a purchase request for a ticket by a purchaser, a ticket sale server providing a request for user information of a user of the ticket for a purchase of the ticket to a purchaser terminal of the purchaser; and (b) in response to acquiring user information of the user of the ticket, the ticket sale server performing (i) a process of transmitting ticket reservation information corresponding to the ticket purchased by the purchaser, wherein the ticket reservation information includes at least one of usage information of the ticket, usage condition information of the ticket, user information of the user of the ticket, and seller information of the ticket, thereby causing the service server (i-1) to create a ticket token corresponding to the ticket by referring to the ticket reservation information, and (i-2) to register generated information for the ticket token in a distributed ledger of a blockchain network, and (ii) a process of transmitting the ticket token to a seller token wallet corresponding to a seller of the ticket, thereby causing the seller token wallet (ii-1) to transmit the ticket token to a user token wallet corresponding to the user of the ticket, and (ii-2) to register movement information of the ticket token from the seller token wallet to the user token wallet in the distributed ledger of the blockchain network.

As one example, the user information of the user of the ticket may include a user DID (decentralized identity) corresponding to the user of the ticket, and wherein the user DID is user identification information used in the blockchain network, and the user DID and authentication information of the user of the ticket for pieces of personal information of the user of the ticket corresponding to the user DID are registered in the distributed ledger of the blockchain network, and the pieces of personal information of the user of the ticket are stored in a user terminal of the user of the ticket or a DID data hub, and wherein the ticket sale server may (i) transmit the ticket reservation information to the service server, thereby causing the service server to request evidential information of the user of the ticket for confirming the usage condition information of the ticket to the user terminal by using the user DID corresponding to the ticket reservation information, and (ii) in response to acquiring the specific evidential information of the user of the ticket from the user terminal or from the DID data hub through interactions with the user terminal, confirm whether the specific evidential information of the user of the ticket satisfies the usage condition information of the ticket, and (iii) in case the specific evidential information of the user of the ticket satisfies the usage condition of the ticket, generate the ticket token corresponding to the ticket.

As one example, the ticket sale server may (i) transmit the ticket reservation information to the service server, thereby causing the service server, (ii) in response to acquiring the specific evidential information of the user of the ticket from the user terminal or from the DID data hub through interactions with the user terminal, (ii-1) to confirm the authentication information registered in the distributed ledger of the blockchain network by using the user DID, and (ii-2) to confirm the specific evidential information of the user of the ticket as valid if the specific evidential information of the user of the ticket matches with the authentication information of the user of the ticket, and (ii-3) to confirm whether the specific evidential information of the user of the ticket satisfies the usage condition information of the ticket.

As one example, the method may further comprise a step of: (c) the ticket sale server making a refund for the ticket to the user of the ticket corresponding to the ticket, when information on a refund request for the ticket is acquired from the service server, wherein the refund request for the ticket is created at the service server after performing processes of: (i) receiving a refund request for the ticket token from a specific user terminal, (ii) confirming whether the ticket token is valid by referring to the movement information of the ticket token registered in the distributed ledger of the blockchain network, (iii) when the ticket token is confirmed as valid, (iii-1) transmitting the ticket token from a specific user token wallet of a specific user to a token refund wallet, and (iii-2) registering the movement information of the ticket token from the specific user token wallet to the token refund wallet in the distributed ledger of the blockchain network, wherein the specific user terminal includes one of the user terminal of the user of the ticket or another user terminal of a third party user who obtained the ticket.

In addition, according to one example of the present invention, there is provided a service server for providing an online ticket service by using a blockchain network, comprising: at least one memory that stores instructions; and at least one processor configured to execute instructions to perform or support another device to perform processes of (I) in response to acquiring ticket reservation information corresponding to a ticket purchased by a purchaser from a ticket sale server, creating a ticket token corresponding to the ticket by referring to the ticket reservation information, and registering generated information on the ticket token in a distributed ledger of a blockchain network, wherein the ticket reservation information includes at least one of usage information of the ticket, usage condition information of the ticket, user information of a user of the ticket, and seller information of the ticket; and (II) transmitting the ticket token to a seller token wallet corresponding to the seller of the ticket, thereby (i) causing the seller token wallet to transmit the ticket token to a user token wallet corresponding to the user of the ticket, and (ii) registering movement information of the ticket token from the seller token wallet to the user token wallet in the distributed ledger of the blockchain network.

As one example, the user information may include a user DID (decentralized identity) corresponding to the user of the ticket, and wherein the user DID is user identification information used in the blockchain network, and the user DID and authentication information of the user of the ticket for pieces of personal information of the user of the ticket corresponding to the user DID are registered in the distributed ledger of the blockchain network, and the pieces of personal information of the user of the ticket are stored in a user terminal of the user of the ticket or a DID data hub, and wherein, at the process of (I), the processor may (i) request specific evidential information of the user to the user terminal by using the user DID corresponding to the ticket reservation information, wherein the specific evidential information is used for confirming the usage condition information of the ticket, (ii) in response to acquiring the specific evidential information of the user of the ticket from the user terminal or from the DID data hub through interactions with the user terminal, confirm whether the specific evidential information of the user of the ticket satisfies the usage condition information of the ticket, and (iii) generate the ticket token corresponding to the ticket in case the specific evidential information of the user of the ticket satisfies the usage condition of the ticket.

As one example, the processor may, in response to acquiring the specific evidential information of the user of the ticket from the user terminal or from the DID data hub through interactions with the user terminal, (i) confirm the authentication information registered in the distributed ledger of the blockchain network by using the user DID, (ii) verify the specific evidential information of the user of the ticket as valid if the specific evidential information of the user of the ticket matches with the authentication information of the user of the ticket, and (iii) confirm whether the specific evidential information of the user of the ticket satisfies the usage condition information of the ticket.

As one example, the processor may further perform or support another device to perform a process of: (III) when the ticket token is transmitted to a token receiving wallet by interactions with a ticket confirmation terminal in response to usage request information of the ticket token from a specific user terminal, wherein the specific user terminal includes one of the user terminal of the user of the ticket or another user terminal of a third party user who obtained the ticket, the service server, (i) confirming whether the ticket token is valid by referring to the movement information of the ticket token registered, in the distributed ledger of the blockchain network, and (ii) when the ticket token is confirmed as valid, transmitting approval information for the ticket usage to the ticket confirmation terminal or the specific user terminal, and registering the usage information of the ticket token in the distributed ledger of the blockchain network.

As one example, in response to acquiring verification information for the approval information from the ticket confirmation terminal or the specific user terminal, the processor may destroy the ticket token stored in the token receiving wallet, and register destruction information of the ticket token in the distributed ledger of the blockchain network.

As one example, in response to acquiring verification information for the approval information from the ticket confirmation terminal or the specific user terminal, the processor may (i) generate a collection token corresponding to the ticket token, (ii) transmit the collection token to the specific user terminal, and (iii) register generated information on the collection token in the distributed ledger of the blockchain network.

As one example, the usage request information of the ticket token may include a specific user DID (decentralized identity) corresponding to a specific user who is the owner of the specific user terminal, wherein the specific user DID is specific user identification information used in the blockchain network, and the specific user DID and authentication information of the specific user for pieces of personal information of the specific user corresponding to the specific user DID are registered in the distributed ledger of the blockchain network, and the pieces of personal information of the specific user are stored in DID data hub or the specific user terminal of the specific user, and wherein the processor may (1) request specific evidential information, of the specific user, for confirming the usage condition information of the ticket to the specific user terminal by using the specific user DID, and (2) in response to acquiring the specific evidential information of the specific user from the specific user terminal or from the DID data hub through interactions with the specific user terminal, verify whether the specific evidential information of the specific user satisfies the usage condition information of the ticket of the ticket reservation information, and (3) when the specific evidential information of the specific user satisfies the usage condition information of the ticket, transmit the approval information for the ticket usage.

As one example, in response to acquiring the specific evidential information of the specific user from the specific user terminal or from the DID data hub through interactions with the specific user terminal, the processor may (i) confirm the authentication information of the specific user registered in the distributed ledger of the blockchain network by using the specific user DID of the specific user, (ii) verify the specific evidential information of the specific user as valid if the specific evidential information of the specific user matches with the authentication information of the specific user, and (3) confirm whether the specific evidential information of the specific user satisfies the usage condition information of the ticket.

As one example, the processor may further perform or support another device to perform a process of: (IV) when a refund request of the ticket token is acquired from the specific user terminal, which includes one of a user terminal of the user of the ticket or another user terminal of a third party user who obtained the ticket, (i) confirming whether the ticket token is valid by referring to the movement information of the ticket token registered in the distributed ledger of the blockchain network, and (ii) when the ticket token is confirmed as valid, (ii-1) transmitting the ticket token from a specific user token wallet of the specific user to a token refund wallet, (ii-2) registering the movement information of the ticket token from the specific user token wallet to the token refund wallet in the distributed ledger of the blockchain network, and (ii-3) transmitting refund request information of the ticket token to the ticket sale server, and thereby instructing the ticket sale server to make a refund for the ticket corresponding to the ticket token.

In addition, according to one example of the present invention, there is provided a ticket sale server for providing an online ticket service by using a blockchain network, comprising: at least one memory that stores instructions; and at least one processor for configured to execute the instructions to perform or support another device to perform: processes of (I) in response to acquiring a purchase request for a ticket by a purchaser, providing a request for user information of a user of the ticket for a purchase of the ticket to the purchaser terminal of the purchaser; and (II) (i) in response to acquiring user information of the user of the ticket, performing transmitting ticket reservation information corresponding to the ticket purchased by the purchaser, wherein the ticket reservation information includes at least one of usage information of the ticket, usage condition information of the ticket, user information of the user of the ticket, and seller information of the ticket, thereby causing the service server (i-1) to create a ticket token corresponding to the ticket by referring to the ticket reservation information, and (i-2) to register generated information for the ticket token in a distributed ledger of a blockchain network, and (ii) transmitting the ticket token to a seller token wallet corresponding to a seller of the ticket, thereby causing the seller token wallet (ii-1) to transmit the ticket token to a user token wallet corresponding to the user of the ticket, and (ii-2) to register movement information of the ticket token from the seller token wallet to the user token wallet in the distributed ledger of the blockchain network.

As one example, the user information of the user of the ticket includes a user DID (decentralized identity) corresponding to the user of the ticket, and wherein the user DID is user identification information used in the blockchain network, and the user DID and authentication information of the user of the ticket for pieces of personal information of the user of the ticket corresponding to the user DID are registered in the distributed ledger of the blockchain network, and the pieces of personal information of the user of the ticket are stored in a user terminal of the user of the ticket or a DID data hub, and wherein the processor may (i) transmit the ticket reservation information to the service server, thereby causing the service server to request evidential information of the user of the ticket for confirming the usage condition information of the ticket to the user terminal by using the user DID corresponding to the ticket reservation information, and (ii) in response to acquiring the specific evidential information of the user of the ticket from the user terminal or from the DID data hub through interactions with the user terminal, confirm whether the specific evidential information of the user of the ticket satisfies the usage condition information of the ticket, and (iii) in case the specific evidential information of the user of the ticket satisfies the usage condition of the ticket, generate the ticket token corresponding to the ticket.

As one example, the processor may (i) transmit the ticket reservation information to the service server, thereby causing the service server, (ii) in response to acquiring the specific evidential information of the user of the ticket from the user terminal or from the DID data hub through interactions with the user terminal, (ii-1) confirm the authentication information registered in the distributed ledger of the blockchain network by using the user DID, and (ii-2) confirm the specific evidential information of the user of the ticket as valid if the specific evidential information of the user of the ticket matches with the authentication information of the user of the ticket, and (ii-3) to confirm whether the specific evidential information of the user of the ticket satisfies the usage condition information of the ticket.

As one example, the processor may further perform or support another device to perform a process of: (III) making a refund for the ticket to the user of the ticket corresponding to the ticket, when information on a refund request for the ticket is acquired from the service server, wherein the refund request for the ticket is created at the service server after performing processes of: (i) receiving a refund request for the ticket token from a specific user terminal, (ii) confirming whether the ticket token is valid by referring to the movement information of the ticket token registered in the distributed ledger of the blockchain network, (iii) when the ticket token is confirmed as valid, (iii-1) transmitting the ticket token from a specific user token wallet of a specific user to a token refund wallet, and (iii-2) registering the movement information of the ticket token from the specific user token wallet to the token refund wallet in the distributed ledger of the blockchain network, wherein the specific user terminal includes one of the user terminal of the user of the ticket or another user terminal of a third party user who obtained the ticket.

In addition, there is provided a computer readable recording medium for recording a computer program for executing the method of the present invention.

DETAILED DESCRIPTION OF THE PREFERRED EMBODIMENTS

Figure 1:
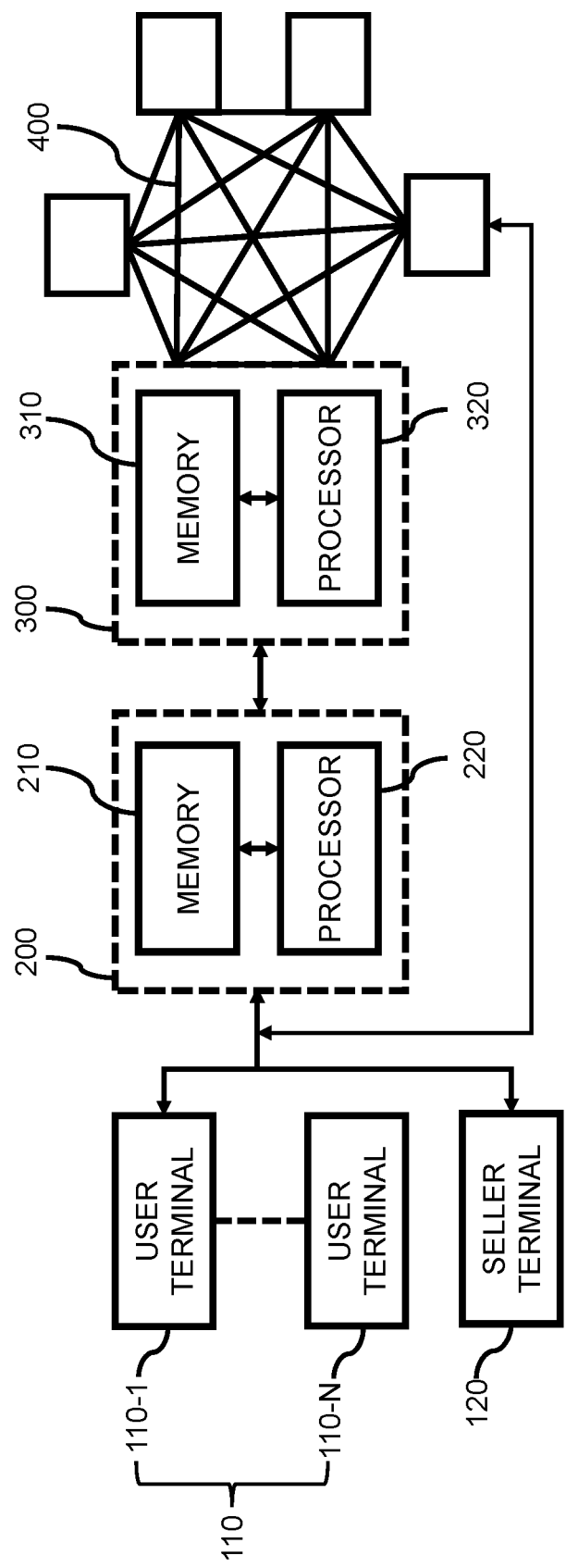
FIG. 1 is a drawing schematically illustrating a system for providing an online ticket service by using a blockchain network in accordance with one example embodiment of the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the present disclosure. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

To allow those skilled in the art to the present disclosure to be carried out easily, the example embodiments of the present disclosure by referring to attached drawings will be explained in detail as shown below.

FIG. 1 is a drawing schematically illustrating a system for providing an online ticket service by using a blockchain network in accordance with one example embodiment of the present disclosure, and referring to FIG. 1, a system may comprise a user terminal 110, a seller terminal 120, a ticket sale server 200 and a service server 300.

Firstly, the user terminal 110 is a subject which manages user personal information and uses a ticket, and may include at least one of a PC (Personal Computer), a mobile computer, a PDA/EDA, a portable telephone, a smartphone, a tablet, an IoT device, etc. In addition, the user terminal 110 is not limited thereto, and may include all devices such as a mobile gaming device capable of wired and wireless communication, a digital camera and a personal navigation. In addition, the user terminal 110 may include at least one memory that stores the user personal information and instructions for ticket use, and at least one processor configured to execute the instructions to perform or support another device to perform operations for the ticket use corresponding to the instructions stored in the memory. Herein, the user terminal 110 may be a purchaser terminal of a purchaser who purchases a ticket or the user terminal of a user of the ticket. That is, the purchaser may designate the user of the ticket as oneself or another user.

Meanwhile, the user terminal 110 may store information corresponding to a user DID (decentralized identity) of the user. Herein, the user DID is user identification information used in the blockchain network, and the user DID and authentication information for pieces of personal information of the user corresponding to the user DID are registered in a distributed ledger of the blockchain network, and the pieces of personal information of the user may be stored in the user terminal 110 of the user or DID data hub. In addition, the personal information of the user may be stored as evidential information corresponding to the authentication information. Herein, the DID data hub stores data requested by the user, and may make only the user or a third party user who has been authorized by the user accessible to the corresponding data.

In addition, the user terminal 110 may include a user token wallet which can store a ticket token related to the ticket.

Next, the seller terminal 120 is a subject for ticket sale, and may include a PC (Personal Computer), a mobile computer, a PDA/EDA, a portable telephone, a smartphone, a tablet, an IoT device, a server, etc. In addition, the user terminal 110 is not limited thereto, and may include all devices such as a mobile gaming device capable of wired and wireless communication, a digital camera and a personal navigation. In addition, the seller terminal 110 may include at least one memory that stores personal information of each of sellers and instructions for ticket sale, and at least one processor configured to execute the instructions to perform or support another device to perform operations for ticket sale corresponding to the instructions stored in the memory. Herein, FIG. 1 shows only one seller terminal 120, but this is for the convenience of explanation, and the seller terminal 120 may be in multiple number corresponding to each of the sellers.

Meanwhile, the seller terminal 120 may store information corresponding to a seller DID (decentralized identity) of the user. Herein, the seller DID is seller identification information used in the blockchain network, and the seller DID and authentication information of a seller for pieces of personal information of the seller corresponding to the seller DID are registered in the distributed ledger of the blockchain network, and the pieces of personal information of the seller may be stored in the seller terminal 120 of the seller. In addition, the pieces of personal information of the seller may be stored as pieces of evidential information corresponding to the authentication information.

In addition, the seller terminal 110 may include the seller token wallet which can store the ticket token related to the ticket. In contrast, the seller token wallet may be contained in the service server 300.

Next, the ticket sale server 200 performs operations related to ticket sale, and may include at least one memory 210 that stores instructions for the ticket sale, and at least one processor 220 configured to execute the instructions to perform or support another device to perform operations for the ticket sale corresponding to the instructions stored in the memory 210.

Specifically, the ticket sale server 200 may achieve a desired system performance by typically using a combination of a computing device (for example, a device which may include features of existing computer devices such as a computer processor, a memory, a storage, an input device and an output device and others; an electronic communication device such as a router and a switch; an electronic information storage system such as a network attached storage (NAS) and a storage area network (SAN)) and computer software (that is, instructions enabling a computing device to function in a specific manner).

In addition, a processor of a computing device may include hardware features such as MPU (Micro Processing Unit) or CPU (Central Processing Unit), Cache Memory and Data Bus. In addition, a computing device may further include software features such as operations system, or an application performing a specific purpose.

Next, the service server 300 provides an online ticket service for the ticket purchased by the user, and may include at least one memory 310 that stores instructions for providing the online ticket service by creating a ticket token corresponding to the ticket purchased by the user and at least one processor 320 configured to execute the instructions to perform or support another device to perform operations for providing the online ticket service by creating the ticket token corresponding to the ticket purchased by the user corresponding to the instructions stored in the memory 310.

Specifically, a service server 300 may achieve a desired system performance by typically using a combination of a computing device (for example, a device which may include features of existing computer devices such as a computer processor, a memory, a storage, an input device and an output device and others; an electronic communication device such as a router and a switch; an electronic information storage system such as a network attached storage (NAS) and a storage area network (SAN)) and computer software (that is, instructions enabling a computing device to function in a specific manner).

In addition, the processor of the computing device may include hardware features such as MPU (Micro Processing Unit) or CPU (Central Processing Unit), Cache Memory and Data Bus. In addition, the computing device may further include software features such as operations system, or an application performing a specific purpose.

A system for providing the online ticket service by using the blockchain network in accordance with one example embodiment of the present disclosure configured as above includes steps of: in response to acquiring ticket reservation information corresponding to a ticket purchased by a purchaser from the ticket sale server 200, the service server 300 creating a ticket token corresponding to the ticket by referring to the ticket reservation information, and registering generated information on the ticket token in the distributed ledger of the blockchain network 400, wherein the ticket reservation information includes at least one of usage information of the ticket, usage condition information of the ticket, user information of a user of the ticket, and seller information of the ticket, and, the service server 300 transmitting the ticket token to a seller token wallet corresponding to the seller of the ticket, thereby (i) causing the seller token wallet to transmit the ticket token to the user token wallet corresponding to the user of the ticket, and (ii) registering movement information of the ticket token from the seller token wallet to the user token wallet in the distributed ledger of the blockchain network.

In addition, it may include steps of: in response to acquiring a purchase request for the ticket by the purchaser, the ticket sale server 200 providing a request for user information of a user of the ticket for a purchase of the ticket to a purchaser terminal of the purchaser; and in response to acquiring user information of the user of the ticket, the ticket sale server 200 performing (i) a process of transmitting ticket reservation information corresponding to the ticket purchased by the purchaser to the service server 300, thereby causing the service server (i-1) to create the ticket token corresponding to the ticket by referring to the ticket reservation information, and (i-2) to register generated information for the ticket token in the distributed ledger of the blockchain network 400, and (ii) a process of transmitting the ticket token to the seller token wallet corresponding to the seller of the ticket, thereby causing the seller token wallet (ii-1) to transmit the ticket token to the user token wallet corresponding to the user of the ticket, and (ii-2) to register movement information of the ticket token from the seller token wallet to the user token wallet in the distributed ledger of the blockchain network 400.

A method for providing the online ticket service by using the system providing the online ticket service by using the blockchain network in accordance with one example embodiment of the present disclosure configured as above is explained as follows.

Figure 2:
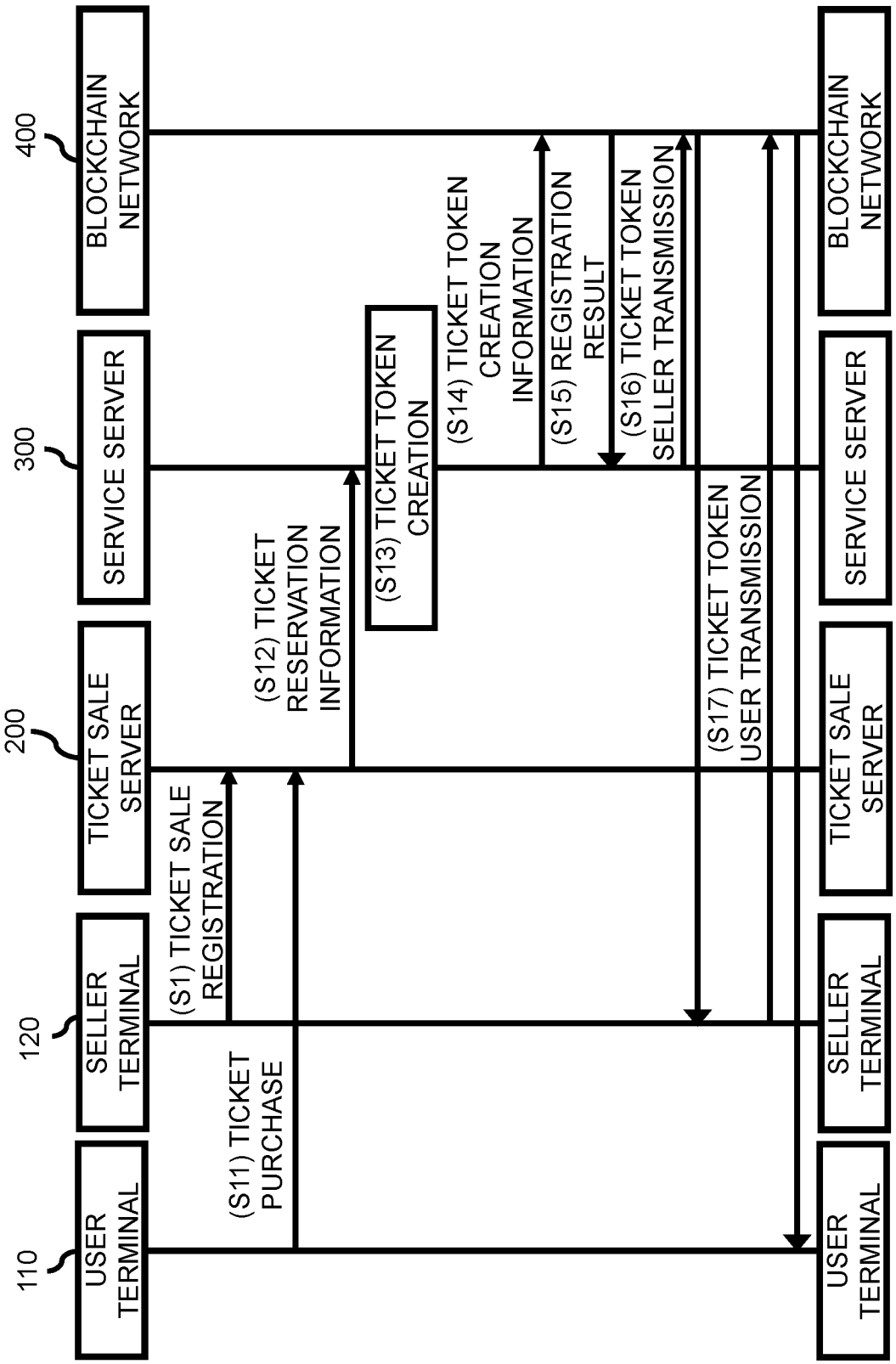
FIG. 2 is a drawing schematically illustrating a method for issuing a ticket token in a method for providing the online ticket service by using the blockchain network in accordance with one example embodiment of the present disclosure.

Referring to FIG. 2, a method for issuing the ticket token in the method for providing the online ticket service by using the blockchain network in accordance with one example embodiment of the present disclosure is explained.

If the seller provides a request for a ticket sale registration for the ticket to be sold through the seller terminal 120 at a step of S1, the ticket sale server 200 registers the ticket requested by the seller to be sold, thereby enabling the user to purchase the desired ticket.

Herein, the ticket may provide authorization to use concerts, plays, musicals, sport events, leisure, exhibition/events, amusement parks, seminars or accommodation, etc.

In addition, the ticket is not limited thereto, and may include all documents for confirming property rights and the authorization of the user such as gift cards, participation pass, boarding pass, purchase token, a certificate for recognizing a particular qualification to participate in a specific competition. In addition, the ticket may include all documents for confirming industrial property rights such as patent rights, utility model rights, trademark rights and design rights, and property rights and authorization of the user such as intangible assets such as franchise, sales rights, mining rights, fishery rights, copyrights, license, etc. which are rights to manufacture or sell goods or services according to specific goods or business name exclusively in a specific region.

Thereafter, if the user purchases the desired ticket at a step of S11 on condition that the user has accessed to the ticket sale server 200 by using the user terminal 110, the ticket sale server 200 creates the ticket reservation information corresponding to the ticket purchased by the user and transmits it to the service server 300 at a step of S12.

Herein, the ticket reservation information may include at least one of usage information of the ticket, usage condition information of the ticket, user information of the user of the ticket, and seller information of the ticket. In addition, the usage information of the ticket may include information such as event information, event place and time information, ticket information for an event corresponding to the ticket, but it is not limited thereto, and may include all pieces of information for the ticket and the event corresponding to the ticket. In addition, the usage condition information of the ticket may include information such as with or without charge condition information of the ticket, the information on a condition of the user who can use the ticket, an expiration date of the ticket and ticket level information. Herein, the information on the condition of the user may include pieces of condition information of the user who can use the ticket such as a gender, an age and a region of the user. In addition, the user information of the user of the ticket may include pieces of information related to the user who intends to use the ticket such as a user DID, a user token wallet address and a purchase quantity. In addition, the seller information may include pieces of information related to the seller such as a seller token wallet address, a seller token revocation wallet address, a seller token refund wallet address, a seller token destruction wallet address and seller event information.

Then, the service server 300 creates the ticket token corresponding to the ticket by referring to the ticket reservation information at a step of S13, and transmits generated information for the ticket token to the blockchain network 400 at a step of S14, thereby allowing the blockchain network 400 to register the generated information for the ticket token in the distributed ledger. Herein, the service server 300 may be at least one blockchain node included in the blockchain network 400, and the service server 300 registers the generated information for the ticket token in the distributed ledger it has, thereby enabling the generated information for the ticket token to be registered in the distributed ledger of the blockchain network 400.

Herein, the service server 300 may confirm whether the user of the ticket satisfies the usage condition information of the ticket by using the user DID of the user of the ticket.

That is, the user DID represents user identification information used in the blockchain network 400. On condition that the user DID and authentication information of the user of the ticket for pieces of the personal information of the user of the ticket corresponding to the user DID have been registered in the distributed ledger of the blockchain network 400 and on condition that pieces of the personal information of the user of the ticket have been stored in the user terminal 110 of the user of the ticket or the DID data hub, the service server 300 may (i) request specific evidential information of the user to the user terminal 110 by using the user DID corresponding to the ticket reservation information, (ii) in response to acquiring the specific evidential information of the user of the ticket from the user terminal or from the DID data hub through interactions with the user terminal 110, confirm whether the specific evidential information of the user of the ticket satisfies the usage condition information of the ticket, and (iii) generate the ticket token corresponding to the ticket in case the specific evidential information of the user of the ticket satisfies the usage condition of the ticket.

Herein, in response to acquiring the specific evidential information of the user of the ticket from the user terminal 110 or from the DID data hub through interactions with the user terminal 110, the service server 300 may (1) confirm the authentication information registered in the distributed ledger of the blockchain network 400 by using the user DID, (2) confirm the specific evidential information of the user of the ticket as valid if the specific evidential information of the user of the ticket matches with the authentication information of the user of the ticket, and (3) confirm whether the specific evidential information of the user of the ticket satisfies the usage condition information of the ticket.

As one example, if the usage condition information of the ticket is a condition related to the age of the user of the ticket, if the service server requests the specific evidential information to the user terminal 110 to prove the age condition which is the usage condition information of the ticket, the user of the ticket transmits the specific evidential information to the service server 300, and the service server 300 confirms the specific evidential information of the user of the ticket as valid if the specific evidential information acquired from the user terminal 100 or the DID data hub matches with the authentication information registered in the blockchain network, and then if the specific evidential information of the user is confirmed as valid, it may confirm whether age information of the user proven by the specific evidential information matches age condition which is the usage condition information of the ticket. Herein, the specific evidential information is used to prove the age by using the user DID. In detail, the specific evidential information is acquired from an authenticating institution, etc. as to the age of the user without disclosing the age or other personal information.

In addition, the service server 300 transmits the ticket token to the seller token wallet corresponding to the seller, thereby causing the seller token wallet to (i) transmit the ticket token to the user token wallet corresponding to the user of the ticket and (ii) register the movement information of the ticket token, from the seller token wallet to the user token wallet, in the blockchain network 400.

As one example, the service server 300 transmits the ticket token to the seller terminal 120 at a step of S16, thereby causing the ticket token to be stored in the seller token wallet created in the seller terminal 120, and registers the seller as a current owner of the ticket token in the distributed ledger of the blockchain network 400. In addition, the seller transmits the ticket token to the user terminal 110 of the ticket token user at a step of S17, thereby causing the ticket token to be stored in the user token wallet created in the user terminal 110, and registers the owner of the ticket token as changed from the seller to the user in the distributed ledger of the blockchain network 400.

Herein, unlike the case in which the seller token wallet is created in the seller terminal 120, as another case, the seller token wallet may be created in the service server 300, and in said another case, the service server 300 stores the created ticket token in the seller ticket wallet, and may cause the seller token wallet to transmit the ticket token to the user token wallet by algorithms such as a smart contract.

In addition, as the case mentioned above, the ticket token corresponding to the ticket purchased through the user terminal 110 was transmitted, but unlike this, the purchaser may set the ticket user as another user, thereby causing the ticket token to be transmitted to the user terminal of the ticket user. That is, the purchaser of the ticket may set the user of the ticket as the purchaser oneself, or a third party user for gift, etc.

Figure 3:
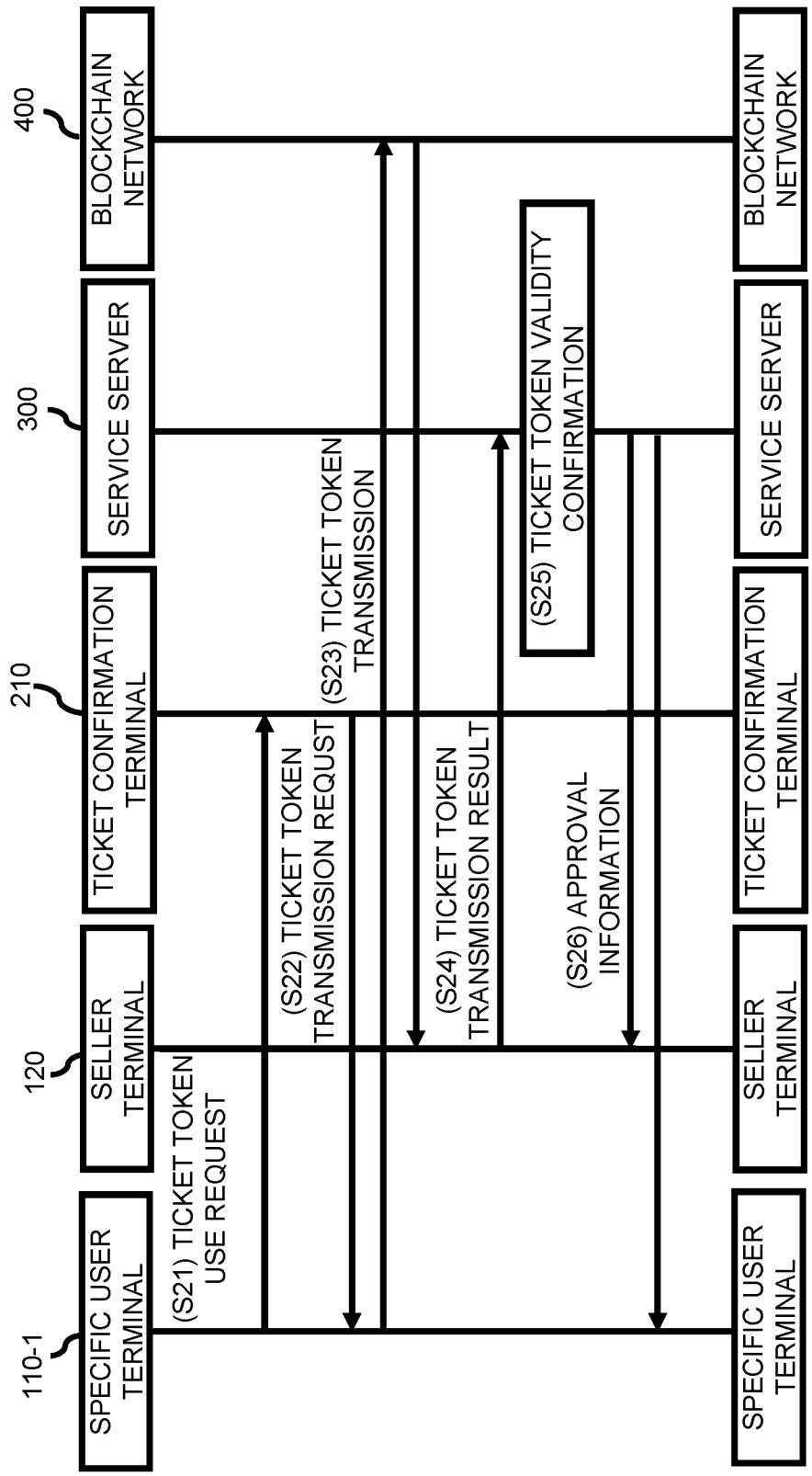
FIG. 3 is a drawing schematically illustrating a method for using the ticket token in the method for providing the online ticket service by using the blockchain network in accordance with one example embodiment of the present disclosure.

Referring to FIG. 3, a method of using the ticket token in the method for providing the online ticket service by using the blockchain network in accordance with one example embodiment of the present disclosure is explained.

A specific user who owns the ticket requests a use of the ticket token to the ticket confirmation terminal 210 by using a specific user terminal 110-1 in order to use the ticket S21.

Herein, the specific user terminal 110-1 may be a user terminal of a person who is designated as the user of the ticket by the request for purchase of the purchaser or the purchaser terminal who purchased the ticket. In addition, the specific user terminal 110-1 may be a terminal of a third party user who owns the ticket token acquired through a transaction with another user. Herein, the ownership can be changed through the transaction of the ticket token, and the ownership change information of the ticket token can be registered in the distributed ledger of the blockchain network 400. In addition, upon a change of the ownership of the ticket token, the smart contract of the blockchain network or the service server may allow or prohibit the ownership transfer by confirming whether the third party user is matched with the usage condition information of the ticket by using the third party user DID of the third party user who has received the ownership of the ticket token. In addition, the ticket confirmation terminal 210 may include all computing devices that can perform interactions with the user terminal such as a scanner and a kiosk that are installed in an event place.

In addition, the ticket confirmation terminal 210 requests the ticket token owned by the user of the ticket to be transmitted to the ticket receiving wallet at a step of S22 by indicating the token receiving wallet address for the use of the ticket token. Then, the user of the ticket transmits the token stored in the user token wallet to the token receiving wallet through the specific user terminal 110-1 at a step of S23, thereby causing the ticket token to be transmitted to the seller terminal 120.

Herein, it is explained that the token receiving wallet is created in the seller terminal 120, but unlike this, the token receiving wallet may be created in the service server 300, and accordingly, the token ticket transmitted from the specific user terminal 110-1 may be transmitted to the service server 300.

Thereafter, if the ticket token is transmitted from the user token wallet of the specific user terminal 110-1 to the token receiving wallet at a step of S24, the service server 300 confirms whether the ticket token is valid by referring to the movement information of the ticket token registered in the distributed ledger of the blockchain network 400 corresponding to the ticket token.

Herein, the service server 300 may confirm whether the ticket token has been normally issued by referring to the movement information of the ticket token, that is whether it has been forged or not, whether a specific user has the ownership for the ticket token, or whether the ticket has been illegally distributed by methods such as illegal tickets.

In addition, a service server 300 may confirm whether the specific user satisfies the usage condition information of the ticket by using the specific user DID which is the information contained in the usage request of the ticket token.

That is, the service server 300 (i) requests specific evidential information, of the specific user, for confirming the usage condition information of the ticket to the specific user terminal 110-1 by using the specific user DID, and (ii) in response to acquiring the specific evidential information of the specific user from the specific user terminal 100-1 or from the DID data hub through interactions with the specific user terminal 100-1, verifies whether the specific evidential information of the specific user satisfies the usage condition information of the ticket of the ticket reservation information, and (iii) when the specific evidential information of the specific user satisfies the usage condition information of the ticket, transmits the approval information for the ticket usage.

Herein, in response to acquiring the specific evidential information of the specific user from the specific user terminal 100-1 or from the DID data hub through interactions with the specific user terminal 100-1, the service server 300 (i) confirms the authentication information of the specific user registered in the distributed ledger of the blockchain network 400 by using the specific user DID of the specific user, (ii) confirms the specific evidential information of the specific user as valid if the specific evidential information of the specific user matches with the authentication information of the specific user, and (iii) confirms whether the specific evidential information of the specific user satisfies the usage condition information of the ticket.

In addition, when the ticket token is confirmed as valid, the service server 300 transmits the approval information for the ticket use to the ticket confirmation terminal 210 or the specific user terminal 110-1, thereby allowing the specific user to perform an event, and registers the usage information of the ticket token in the distributed ledger of the blockchain network 400, thereby preventing the redundant use, etc. of the ticket token, or preventing illegal distribution of the ticket token which has been used.

In addition, in response to acquiring confirmation information for the approval information from the ticket confirmation terminal 210 or the specific user terminal 110-1, the service server 300 may (i) generate a collection token corresponding to the ticket token, (ii) transmit the collection token to the specific user terminal 110-1, and (iii) register generated information on the collection token in the distributed ledger of the blockchain network. That is, the service server 300 may provide the collection token as a benefit in return according to the use of the ticket token to the user of the ticket. As one example, if the event corresponding to the ticket token is a performance of an artist, the collection token related to the artist may be provided to users who participated in the performance.

In addition, in response to acquiring confirmation information for the approval information from the ticket confirmation terminal 210 or the specific user terminal 110-1, the service server 300 destroys the ticket token stored in the token receiving wallet, and registers destruction information of the ticket token in the distributed ledger of the blockchain network 400. As to the destruction of the ticket token, the explanation is provided as follows in detail.

Figure 4:
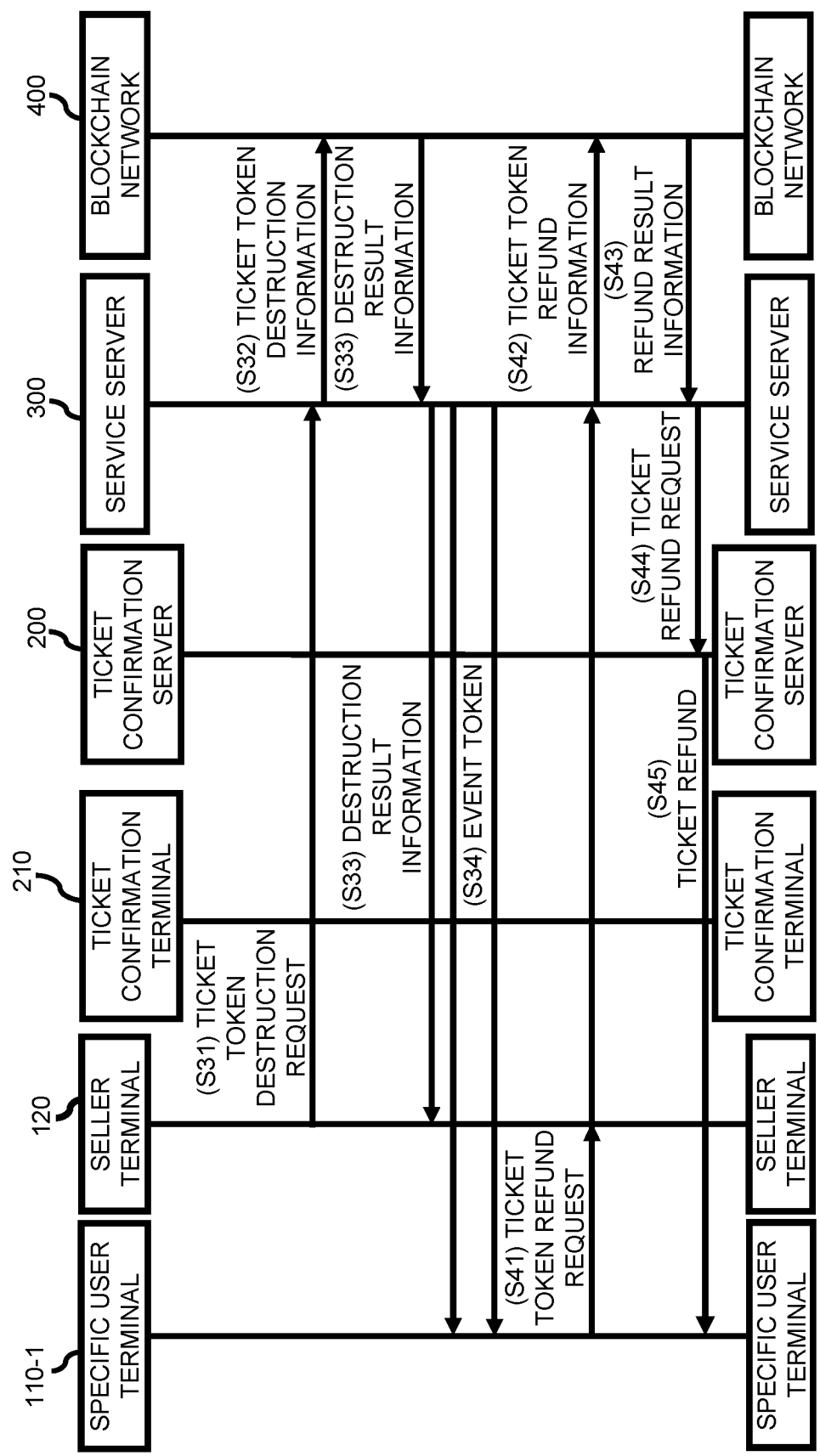
FIG. 4 is a drawing schematically illustrating a method for destroying and refunding the ticket token in the method for providing the online ticket service by using the blockchain network in accordance with one example embodiment of the present disclosure.

Referring to FIG. 4, a method for destroying and refunding the ticket token in the method for providing the online ticket service by using the blockchain network in accordance with one example embodiment of the present disclosure is explained.

According to the method as in FIG. 3, in response to the destruction condition of the ticket token being satisfied after the ticket token is used and accordingly the ticket token is transmitted to the ticket receiving wallet or in response to receiving a ticket token destruction request from the seller terminal 120 at a step of S31, the service server 300 may destroy the ticket token, and register the ticket token destruction information in the distributed ledger of the blockchain network 400 at steps of S32 and S33.

In addition, the destruction condition of the ticket token may be variously set, and the service server 300 may monitor the movement information of the ticket token and as a result in case the ticket token is detected as being illegally distributed or the expiration date of the ticket token is detected as having been expired, the service server 300 may destroy the ticket token by the method as above.

Herein, the service server 300 may refer to history information for the ticket token (requested to be destroyed) in the distributed ledger of the blockchain network 400 to thereby confirm whether the ticket token is valid, and may confirm whether an entity requesting the destruction has a proper ownership for the ticket by using the entity DID of the entity.

In addition, in response to the ticket token refund request from the specific user terminal 100-1 having the ownership of the ticket token, the service server 300 may proceed with the refund for the ticket token.

That is, when the refund request of the ticket token is acquired from the specific user terminal 110-1 or from the seller terminal 120 at a step of S41, the service server 300 confirms whether the ticket token is valid by referring to the movement information of the ticket token registered in the distributed ledger of the blockchain network 400. In addition, if the ticket token is confirmed as valid, the ticket token is transmitted from the specific user token wallet of the specific user to a token refund wallet, and the movement information of the ticket token from the specific user token wallet to the token refund wallet is registered in the distributed ledger of the blockchain network 400 at steps of S42 and S43.

Herein, the service server 300 may refer to the history information for the ticket token (requested to be refunded) in the distributed ledger of the blockchain network 400 to thereby confirm whether the ticket token is valid, and may confirm whether an entity requesting the refund has a proper ownership for the ticket by using the entity DID of the entity.

In addition, the service server 300 transmits the refund request information of the ticket token to the ticket sale server 200 at a step of S44, thereby causing the ticket sale server 200 to make a refund for the ticket corresponding to the ticket token at a step of S45.

Meanwhile, as one example, the issuance, the usage, the destruction and the refund, etc. of the ticket token through the interactions of the service server and the seller terminal have been explained, but unlike this, the service server may have ownerships of token wallets created related to the sellers, and may implement the interactions according to the issuance, the usage, the destruction, the refund, etc. of the ticket token as the smart contract.

The present disclosure has an effect of preventing illegal ticket purchases using macro programs, etc. by providing the ticket service by using the blockchain network.

The present disclosure has another effect of preventing the inconvenience of the user by using the DID (decentralized identity) of the blockchain network.

The present disclosure has still another effect of easily verifying the ownership and the genuineness of the ticket by managing the ticket through the blockchain network.

The present disclosure has still another effect of securing the transparency of ticket sales by managing tickets through the blockchain network.

The present disclosure has still another effect of issuing and distributing the tickets regardless of the region, thereby securing the reliability of the secondary resale market.

The present disclosure has still another effect of preventing damages due to ticket forgery/fraud and ticket delivery delay, etc. by managing the ticket tokens corresponding to the tickets through the blockchain network.

Besides, the embodiments of the present disclosure as explained above can be implemented in a form of executable program command through a variety of computer means recordable to computer readable media. The computer readable media may store solely or in combination, program commands, data files, and data structures. The program commands recorded in the media may be components specially designed for the present disclosure or may be usable for a skilled human in a field of computer software. The computer readable media include, but are not limited to, magnetic media such as hard drives, floppy diskettes, magnetic tapes, memory cards, solid-state drives, USB flash drives, optical media such as CD-ROM and DVD, magneto-optical media such as floptical diskettes and hardware devices such as a read-only memory (ROM), a random access memory (RAM), and a flash memory specially designed to store and carry out program commands. Program commands may include not only a machine language code made by a compiler but also a high level code that can be used by an interpreter etc., which is executed by a computer. The aforementioned hardware device may work as more than a software module to perform the action of the present disclosure and they may do the same in the opposite case.

As seen above, the present disclosure has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for providing an online ticket service by using a blockchain network, comprising steps of: (a) in response to acquiring ticket reservation information corresponding to a ticket purchased by a purchaser from a ticket sale server, a service server creating a ticket token corresponding to the ticket by referring to the ticket reservation information, and registering generated information on the ticket token in a distributed ledger of a blockchain network, wherein the ticket reservation information includes at least one of usage information of the ticket, usage condition information of the ticket, user information of a user of the ticket, and seller information of the ticket; and (b) the service server transmitting the ticket token to a seller token wallet corresponding to the seller of the ticket, thereby (i) causing the seller token wallet to transmit the ticket token to a user token wallet corresponding to the user of the ticket, and (ii) registering movement information of the ticket token from the seller token wallet to the user token wallet in the distributed ledger of the blockchain network; wherein the user information includes a user DID (decentralized identity) corresponding to the user of the ticket, and wherein the user DID is user identification information used in the blockchain network, and the user DID and authentication information of the user of the ticket for pieces of personal information of the user of the ticket corresponding to the user DID are registered in the distributed ledger of the blockchain network, and the pieces of personal information of the user of the ticket are stored in a user terminal of the user of the ticket or a DID data hub, and wherein, at the step of (a), the service server (i) requests specific evidential information of the user to the user terminal by using the user DID corresponding to the ticket reservation information, wherein the specific evidential information is used for confirming the usage condition information of the ticket, (ii) in response to acquiring the specific evidential information of the user of the ticket from the user terminal or from the DID data hub through interactions with the user terminal, confirms whether the specific evidential information of the user of the ticket satisfies the usage condition information of the ticket, and (iii) generates the ticket token corresponding to the ticket in case the specific evidential information of the user of the ticket satisfies the usage condition of the ticket.

2. The method of claim 1, wherein the service server, in response to acquiring the specific evidential information of the user of the ticket from the user terminal or from the DID data hub through interactions with the user terminal, (i) confirms the authentication information registered in the distributed ledger of the blockchain network by using the user DID, (ii) verifies the specific evidential information of the user of the ticket as valid if the specific evidential information of the user of the ticket matches with the authentication information of the user of the ticket, and (iii) confirms whether the specific evidential information of the user of the ticket satisfies the usage condition information of the ticket.

3. The method of claim 1, further comprising a step of:
(c) when the ticket token is transmitted to a token receiving wallet by interactions with a ticket confirmation terminal in response to usage request information of the ticket token from a specific user terminal, wherein the specific user terminal includes one of the user terminal of the user of the ticket or another user terminal of a third party user who obtained the ticket, the service server, (i) confirming whether the ticket token is valid by referring to the movement information of the ticket token registered, in the distributed ledger of the blockchain network, and (ii) when the ticket token is confirmed as valid, transmitting approval information for the ticket usage to the ticket confirmation terminal or the specific user terminal, and registering the usage information of the ticket token in the distributed ledger of the blockchain network.

4. The method of claim 3, wherein, in response to acquiring verification information for the approval information from the ticket confirmation terminal or the specific user terminal, the service server destroys the ticket token stored in the token receiving wallet, and registers destruction information of the ticket token in the distributed ledger of the blockchain network.

5. The method of claim 3, wherein, in response to acquiring verification information for the approval information from the ticket confirmation terminal or the specific user terminal, the service server (i) generates a collection token corresponding to the ticket token, (ii) transmits the collection token to the specific user terminal, and (iii) registers generated information on the collection token in the distributed ledger of the blockchain network.

6. The method of claim 3, wherein the usage request information of the ticket token includes a specific user DID (decentralized identity) corresponding to a specific user who is the owner of the specific user terminal, wherein the specific user DID is specific user identification information used in the blockchain network, and the specific user DID and authentication information of the specific user for pieces of personal information of the specific user corresponding to the specific user DID are registered in the distributed ledger of the blockchain network, and the pieces of personal information of the specific user are stored in DID data hub or the specific user terminal of the specific user, and wherein the service server (i) requests specific evidential information, of the specific user, for confirming the usage condition information of the ticket to the specific user terminal by using the specific user DID, and (ii) in response to acquiring the specific evidential information of the specific user from the specific user terminal or from the DID data hub through interactions with the specific user terminal, verifies whether the specific evidential information of the specific user satisfies the usage condition information of the ticket of the ticket reservation information, and (iii) when the specific evidential information of the specific user satisfies the usage condition information of the ticket, transmits the approval information for the ticket usage.

7. The method of claim 6, wherein the service server, in response to acquiring the specific evidential information of the specific user from the specific user terminal or from the DID data hub through interactions with the specific user terminal, (i) confirms the authentication information of the specific user registered in the distributed ledger of the blockchain network by using the specific user DID of the specific user, (ii) verifies the specific evidential information of the specific user as valid if the specific evidential information of the specific user matches with the authentication information of the specific user, and (iii) confirms whether the specific evidential information of the specific user satisfies the usage condition information of the ticket.

8. The method of claim 1, further comprising a step of: (d) when a refund request of the ticket token is acquired from the specific user terminal, which includes one of a user terminal of the user of the ticket or another user terminal of a third party user who obtained the ticket, the service server (i) confirming whether the ticket token is valid by referring to the movement information of the ticket token registered in the distributed ledger of the blockchain network, and (ii) when the ticket token is confirmed as valid, (ii-1) transmitting the ticket token from a specific user token wallet of the specific user to a token refund wallet, (ii-2) registering the movement information of the ticket token from the specific user token wallet to the token refund wallet in the distributed ledger of the blockchain network, and (ii-3) transmitting refund request information of the ticket token to the ticket sale server, and thereby instructing the ticket sale server to make a refund for the ticket corresponding to the ticket token.

9. A method for providing an online ticket service by using a blockchain network, comprising steps of: (a) in response to acquiring a purchase request for a ticket by a purchaser, a ticket sale server providing a request for user information of a user of the ticket for a purchase of the ticket to a purchaser terminal of the purchaser; and (b) in response to acquiring user information of the user of the ticket, the ticket sale server performing (i) a process of transmitting ticket reservation information corresponding to the ticket purchased by the purchaser, wherein the ticket reservation information includes at least one of usage information of the ticket, usage condition information of the ticket, user information of the user of the ticket, and seller information of the ticket, thereby causing the service server (i-1) to create a ticket token corresponding to the ticket by referring to the ticket reservation information, and (i-2) to register generated information for the ticket token in a distributed ledger of a blockchain network, and (ii) a process of transmitting the ticket token to a seller token wallet corresponding to a seller of the ticket, thereby causing the seller token wallet (ii-1) to transmit the ticket token to a user token wallet corresponding to the user of the ticket, and (ii-2) to register movement information of the ticket token from the seller token wallet to the user token wallet in the distributed ledger of the blockchain network; wherein the user information of the user of the ticket includes a user DID (decentralized identity) corresponding to the user of the ticket, and wherein the user DID is user identification information used in the blockchain network, and the user DID and authentication information of the user of the ticket for pieces of personal information of the user of the ticket corresponding to the user DID are registered in the distributed ledger of the blockchain network, and the pieces of personal information of the user of the ticket are stored in a user terminal of the user of the ticket or a DID data hub, and wherein the ticket sale server (i) transmits the ticket reservation information to the service server, thereby causing the service server to request evidential information of the user of the ticket for confirming the usage condition information of the ticket to the user terminal by using the user DID corresponding to the ticket reservation information, and (ii) in response to acquiring the specific evidential information of the user of the ticket from the user terminal or from the DID data hub through interactions with the user terminal, confirms whether the specific evidential information of the user of the ticket satisfies the usage condition information of the ticket, and (iii) in case the specific evidential information of the user of the ticket satisfies the usage condition of the ticket, generates the ticket token corresponding to the ticket.

10. The method of claim 9, wherein the ticket sale server (i) transmits the ticket reservation information to the service server, thereby causing the service server, (ii) in response to acquiring the specific evidential information of the user of the ticket from the user terminal or from the DID data hub through interactions with the user terminal, (ii-1) to confirm the authentication information registered in the distributed ledger of the blockchain network by using the user DID, and (ii-2) to confirm the specific evidential information of the user of the ticket as valid if the specific evidential information of the user of the ticket matches with the authentication information of the user of the ticket, and (ii-3) to confirm whether the specific evidential information of the user of the ticket satisfies the usage condition information of the ticket.

11. The method of claim 9, further comprising a step of: (c) the ticket sale server making a refund for the ticket to the user of the ticket corresponding to the ticket, when information on a refund request for the ticket is acquired from the service server, wherein the refund request for the ticket is created at the service server after performing processes of: (i) receiving a refund request for the ticket token from a specific user terminal, (ii) confirming whether the ticket token is valid by referring to the movement information of the ticket token registered in the distributed ledger of the blockchain network, (iii) when the ticket token is confirmed as valid, (iii-1) transmitting the ticket token from a specific user token wallet of a specific user to a token refund wallet, and (iii-2) registering the movement information of the ticket token from the specific user token wallet to the token refund wallet in the distributed ledger of the blockchain network, wherein the specific user terminal includes one of the user terminal of the user of the ticket or another user terminal of a third party user who obtained the ticket.

12. A service server for providing an online ticket service by using a blockchain network, comprising: at least one memory that stores instructions; and at least one processor configured to execute the instructions to perform or support another device to perform: processes of (I) in response to acquiring ticket reservation information corresponding to a ticket purchased by a purchaser from a ticket sale server, creating a ticket token corresponding to the ticket by referring to the ticket reservation information, and registering generated information on the ticket token in a distributed ledger of a blockchain network, wherein the ticket reservation information includes at least one of usage information of the ticket, usage condition information of the ticket, user information of a user of the ticket, and seller information of the ticket; and (II) transmitting the ticket token to a seller token wallet corresponding to the seller of the ticket, thereby (i) causing the seller token wallet to transmit the ticket token to a user token wallet corresponding to the user of the ticket, and (ii) registering movement information of the ticket token from the seller token wallet to the user token wallet in the distributed ledger of the blockchain network; wherein the user information includes a user DID (decentralized identity) corresponding to the user of the ticket, and wherein the user DID is user identification information used in the blockchain network, and the user DID and authentication information of the user of the ticket for pieces of personal information of the user of the ticket corresponding to the user DID are registered in the distributed ledger of the blockchain network, and the pieces of personal information of the user of the ticket are stored in a user terminal of the user of the ticket or a DID data hub, and wherein, at the process of (I), the processor (i) requests specific evidential information of the user to the user terminal by using the user DID corresponding to the ticket reservation information, wherein the specific evidential information is used for confirming the usage condition information of the ticket, (ii) in response to acquiring the specific evidential information of the user of the ticket from the user terminal or from the DID data hub through interactions with the user terminal, confirms whether the specific evidential information of the user of the ticket satisfies the usage condition information of the ticket, and (iii) generates the ticket token corresponding to the ticket in case the specific evidential information of the user of the ticket satisfies the usage condition of the ticket.

13. The service server of claim 12, wherein, in response to acquiring the specific evidential information of the user of the ticket from the user terminal or from the DID data hub through interactions with the user terminal, the processor (i) confirms the authentication information registered in the distributed ledger of the blockchain network by using the user DID, (ii) verifies the specific evidential information of the user of the ticket as valid if the specific evidential information of the user of the ticket matches with the authentication information of the user of the ticket, and (iii)

confirms whether the specific evidential information of the user of the ticket satisfies the usage condition information of the ticket.

14. The service server of claim 12, wherein, the processor further performs or supports another device to perform a process of: (III) when the ticket token is transmitted to a token receiving wallet by interactions with a ticket confirmation terminal in response to usage request information of the ticket token from a specific user terminal, wherein the specific user terminal includes one of the user terminal of the user of the ticket or another user terminal of a third party user who obtained the ticket, (i) confirming whether the ticket token is valid by referring to the movement information of the ticket token registered, in the distributed ledger of the blockchain network, and (ii) when the ticket token is confirmed as valid, transmitting approval information for the ticket usage to the ticket confirmation terminal or the specific user terminal, and registering the usage information of the ticket token in the distributed ledger of the blockchain network.

15. The service server of claim 14, wherein, in response to acquiring verification information for the approval information from the ticket confirmation terminal or the specific user terminal, the processor destroys the ticket token stored in the token receiving wallet, and registers destruction information of the ticket token in the distributed ledger of the blockchain network.

16. The service server of claim 14, wherein, in response to acquiring verification information for the approval information from the ticket confirmation terminal or the specific user terminal, the processor (i) generates a collection token corresponding to the ticket token, (ii) transmits the collection token to the specific user terminal, and (iii) registers generated information on the collection token in the distributed ledger of the blockchain network.

17. The service server of claim 14, wherein the usage request information of the ticket token includes a specific user DID (decentralized identity) corresponding to a specific user who is the owner of the specific user terminal, wherein the specific user DID is specific user identification information used in the blockchain network, and the specific user DID and authentication information of the specific user for pieces of personal information of the specific user corresponding to the specific user DID are registered in the distributed ledger of the blockchain network, and the pieces of personal information of the specific user are stored in DID data hub or the specific user terminal of the specific user, and wherein the processor (i) requests specific evidential information, of the specific user, for confirming the usage condition information of the ticket to the specific user terminal by using the specific user DID, and (ii) in response to acquiring the specific evidential information of the specific user from the specific user terminal or from the DID data hub through interactions with the specific user terminal, verifies whether the specific evidential information of the specific user satisfies the usage condition information of the ticket of the ticket reservation information, and (iii) when the specific evidential information of the specific user satisfies the usage condition information of the ticket, transmits the approval information for the ticket usage.

18. The service server of claim 17, wherein, in response to acquiring the specific evidential information of the specific user from the specific user terminal or from the DID data hub through interactions with the specific user terminal, the processor (i) confirms the authentication information of the specific user registered in the distributed ledger of the blockchain network by using the specific user DID of the specific user, (ii) verifies the specific evidential information of the specific user as valid if the specific evidential information of the specific user matches with the authentication information of the specific user, and (iii) confirms whether the specific evidential information of the specific user satisfies the usage condition information of the ticket.

19. The service server of claim 12, wherein the processor further performs or supports another device to perform a process of: (IV) when a refund request of the ticket token is acquired from the specific user terminal, which includes one of a user terminal of the user of the ticket or another user terminal of a third party user who obtained the ticket, (i) confirming whether the ticket token is valid by referring to the movement information of the ticket token registered in the distributed ledger of the blockchain network, and (ii) when the ticket token is confirmed as valid, (ii-1) transmitting the ticket token from a specific user token wallet of the specific user to a token refund wallet, (ii-2) registering the movement information of the ticket token from the specific user token wallet to the token refund wallet in the distributed ledger of the blockchain network, and (ii-3) transmitting refund request information of the ticket token to the ticket sale server, and thereby instructing the ticket sale server to make a refund for the ticket corresponding to the ticket token.

20. A ticket sale server for providing an online ticket service by using a blockchain network, comprising: at least one memory that stores instructions;

and at least one processor configured to execute the instructions to perform or support another device to perform: processes of (I) in response to acquiring a purchase request for a ticket by a purchaser, providing a request for user information of a user of the ticket for a purchase of the ticket to a purchaser terminal of the purchaser; and (II) (i) in response to acquiring user information of the user of the ticket, performing transmitting ticket reservation information corresponding to the ticket purchased by the purchaser, wherein the ticket reservation information includes at least one of usage information of the ticket, usage condition information of the ticket, user information of the user of the ticket, and seller information of the ticket, thereby causing the service server (i-1) to create a ticket token corresponding to the ticket by referring to the ticket reservation information, and (i-2) to register generated information for the ticket token in a distributed ledger of a blockchain network, and (ii) transmitting the ticket token to a seller token wallet corresponding to a seller of the ticket, thereby causing the seller token wallet (ii-1) to transmit the ticket token to a user token wallet corresponding to the user of the ticket, and (ii-2) to register movement information of the ticket token from the seller token wallet to the user token wallet in the distributed ledger of the blockchain network, wherein the user information of the user of the ticket includes a user DID(decentralized identity) corresponding to the user of the ticket, and wherein the user DID is user identification information used in the blockchain network, and the user DID and authentication information of the user of the ticket for pieces of personal information of the user of the ticket corresponding to the user DID are registered in the distributed ledger of the blockchain network, and the pieces of personal information of the user of the ticket are stored in a user terminal of the user of the ticket or a DID data hub, and wherein the processor (i) transmits the ticket reservation information to the service server, thereby causing the service server to request evidential information of the user of the ticket for confirming the usage condition information of the ticket to the user terminal by using the user DID corresponding to the ticket reservation information, and (ii) in response to acquiring the specific evidential information of the user of the ticket from the user terminal or from the DID data hub through interactions with the user terminal, confirms whether the specific evidential information of the user of the ticket satisfies the usage condition information of the ticket, and (iii) in case the specific evidential information of the user of the ticket satisfies the usage condition of the ticket, generates the ticket token corresponding to the ticket.

21. The ticket sale server of claim 20, wherein the processor (i) transmits the ticket reservation information to the service server, thereby causing the service server, (ii) in response to acquiring the specific evidential information of the user of the ticket from the user terminal or from the DID data hub through interactions with the user terminal, (ii-1) confirms the authentication information registered in the distributed ledger of the blockchain network by using the user DID, and (ii-2) confirms the specific evidential information of the user of the ticket as valid if the specific evidential information of the user of the ticket matches with the authentication information of the user of the ticket, and (ii-3) confirms whether the specific evidential information of the user of the ticket satisfies the usage condition information of the ticket.

22. The ticket sale server of claim 20, wherein the processor further performs or supports another device to perform a process of: (III) making a refund for the ticket to the user of the ticket corresponding to the ticket, when information on a refund request for the ticket is acquired from the service server, wherein the refund request for the ticket is created at the service server after performing processes of: (i) receiving a refund request for the ticket token from a specific user terminal, (ii) confirming whether the ticket token is valid by referring to the movement information of the ticket token registered in the distributed ledger of the blockchain network, (iii) when the ticket token is confirmed as valid, (iii-1) transmitting the ticket token from a specific user token wallet of a specific user to a token refund wallet, and (iii-2) registering the movement information of the ticket token from the specific user token wallet to the token refund wallet in the distributed ledger of the blockchain network, wherein the specific user terminal includes one of the user terminal of the user of the ticket or another user terminal of a third party user who obtained the ticket.

* * * * *